(12) United States Patent
Kolanek et al.

(10) Patent No.: US 7,286,085 B2
(45) Date of Patent: Oct. 23, 2007

(54) PRECISION GEOLOCATION SYSTEM AND METHOD USING A LONG BASELINE INTERFEROMETER ANTENNA SYSTEM

(75) Inventors: James Kolanek, Goleta, CA (US); Eric Carlsen, Fairborn, OH (US)

(73) Assignee: Sierra Nevada Corporation, Sparks, NV (US)

( * ) Notice: Subject to any disclaimer, the term of this patent is extended or adjusted under 35 U.S.C. 154(b) by 26 days.

(21) Appl. No.: 11/201,451

(22) Filed: Aug. 11, 2005

(65) Prior Publication Data

US 2006/0114157 A1    Jun. 1, 2006

Related U.S. Application Data

(60) Provisional application No. 60/600,715, filed on Aug. 11, 2004.

(51) Int. Cl.
    *G01S 5/02* (2006.01)
(52) U.S. Cl. .................... 342/424; 342/442
(58) Field of Classification Search ........ 342/417, 342/424, 442, 450, 463, 464
    See application file for complete search history.

(56) References Cited

U.S. PATENT DOCUMENTS

| | | | | |
|---|---|---|---|---|
| 4,809,005 A | * | 2/1989 | Counselman, III | ........ 342/352 |
| 5,343,212 A | * | 8/1994 | Rose et al. | ............... 342/424 |
| 5,583,513 A | * | 12/1996 | Cohen | ............... 342/357.06 |
| 5,835,060 A | * | 11/1998 | Czarnecki et al. | ......... 342/442 |
| 6,088,653 A | * | 7/2000 | Sheikh et al. | ............... 701/214 |
| 6,336,061 B1 | * | 1/2002 | Deines et al. | ............... 701/13 |
| 2005/0004748 A1 | * | 1/2005 | Pinto et al. | ............... 701/200 |

* cited by examiner

*Primary Examiner*—Dao L. Phan
(74) *Attorney, Agent, or Firm*—Bose McKinney & Evans LLP

(57) ABSTRACT

A long baseline interferometer antenna system and method for determining the location of an emitter. The long baseline interferometer antenna system comprises a first antenna, a second antenna, an inertial navigation system, an antenna baseline measurement system, a multi-channel receiver and a processor. The first and second antenna elements are positioned on a platform and are both configured to receive signals from the emitter. The first and second antenna elements form a long baseline antenna pair. The inertial navigation system measures the platform position and attitude; and the antenna baseline measurement system measures the antenna baseline vector between the first and second antenna elements. The multi-channel receiver measures the differential phase between antenna pairs, and the processor computes the emitter location. Additional antenna elements can be included and some can be configured as squinted beam pair and make use of amplitude difference of arrival measurements.

13 Claims, 18 Drawing Sheets

| Nomenclature | Baseline (wavelengths) | Angular Precision @ 20 dB SNR | Number of Ambiguities in ±90 deg Sector | Length at $f_o$ = 10 GHz |
|---|---|---|---|---|
| Short Baseline Interferometer (SBI) | < 5 λ | 4.5 m-rad | 10 | <5 cm |
| Medium Baseline Interferometer (MBI) | 5 to 50 λ | 4.5 to 0.45 m-rad | 10 to 100 | 15-150 cm |
| Long Baseline Interferometer (LBI) | 50 to 500 λ | 45 to 4.5 u-rad | 100 to 1000 | 1.5-15 m |
| Very long Baseline Interferometer (VLBI) | 500 to 5000 λ | 4.5 to 0.45 u-rad | 1000 to 10K | 15-150 m |
| Ultra long Baseline Interferometer (ULBI) | > 5000 λ | 0.045 to 0.0045 u-rad. | 10K to 100K | >150 m |

FIGURE 2

PRECISION GEOLOCATION SYSTEM AND METHOD USING A LONG BASELINE INTERFEROMETER ANTENNA SYSTEM

RELATED APPLICATIONS

This application claims the benefit of U.S. Provisional Application Ser. No. 60/600,715, filed Aug. 11, 2004, the full disclosure of which is hereby expressly incorporated by reference.

TECHNICAL FIELD OF THE INVENTION

The present invention relates to methods and systems for precision geolocation of an emitter whose location is sought by a moving platform monitoring signals transmitted by the emitter. More specifically, the invention relates to precision geolocation by a platform having a long baseline interferometer antenna system that monitors electromagnetic signals transmitted by the emitter.

BACKGROUND OF THE INVENTION

Multiple observer and single observer geolocation systems that monitor an emitter's signals to determine its location are known in the art. The monitoring system makes multiple observations of the emitter signal at multiple locations and measures characteristics of the received signals and processes these measurements to predict the location of the emitter. Various characteristics of the emitter's signal can be measured including angle of arrival, time of arrival, relative phase, etc. The accuracy and precision of the geolocation system is dependent on the accuracy and precision of various factors, including the emitter signal measurements, and the knowledge of the detector locations.

Multiple observer geolocation systems can make multiple observations of an emitter's signals from multiple locations simultaneously and can therefore provide nearly instantaneous geolocation of an emitter detected by the multiple observers. Multiple observer systems generally rely on time difference of arrival and/or Doppler difference of arrival measurements. However, multiple observer systems require station keeping, precision clocks and a high degree of synchronization to select the desired signal of interest.

Single observer geolocation systems do not require the precise synchronization of multiple observer systems but they require time to collect observations of the emitter signal from multiple locations. Single observer systems generally rely on angle of arrival schemes using amplitude difference of arrival, phase difference of arrival, as well as, time difference of arrival and/or Doppler difference of arrival measurements. In the past, single observer systems were generally less accurate than multiple observer systems.

A long baseline interferometer antenna system is a system in which the separation between the end elements in an array of detectors is some large number of wavelengths. The length of this separation, or the distance between end elements, is referred to as the interferometer baseline. Interferometer antenna arrays typically are sparse having only a few elements compared to a full array where the elements are typically spaced at half wavelength intervals.

SUMMARY OF THE INVENTION

The very long baseline geolocation system and method of the present invention provides geolocation accuracy using a single platform equivalent to that of multiple observer systems. Geolocation accuracies have been observed with the present invention on the order a 100 foot circular error probability for an emitter at a distance of 100 nautical miles, with observation times typically ranging from 1 to 5 minutes. Of course, the system can provide less precise measurements in shorter times.

Features of the present invention include:
- simple installation, requiring a small number ESM/GSM antenna elements that can be located at the extremities of the platform,
- robust geolocation method compatible with periodic or scheduled signal collection methods,
- precision antenna baseline measurement system based on co-located GPS antennas,
- self-calibration.

Additional features and advantages of the present invention will be evident from the following description of the drawings and exemplary embodiments.

BRIEF DESCRIPTION OF THE DRAWINGS

FIG. 2 is a table showing some parameters of various classes of long baseline interferometers;

DETAILED DESCRIPTION OF THE INVENTION

Figure 1:
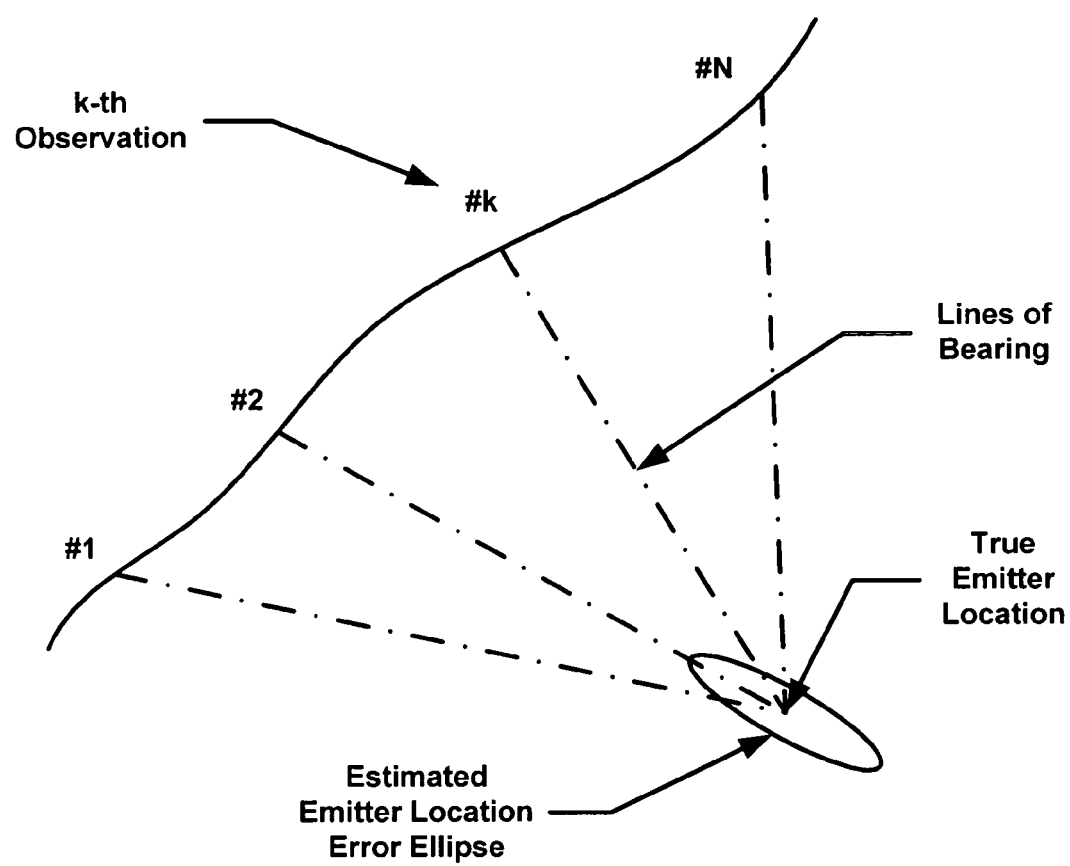
FIG. 1 is a simplified two dimensional view of a single observer triangulation process.

A single observer geolocation method can be illustrated as an equivalent triangulation process, as shown in the simplified two dimensional view of FIG. 1. A platform moving along a measurement path from point #1 to point #N makes multiple observations of the radio frequency signals transmitted by an emitter whose location is sought. From the observations, the system computes lines of bearing between the measurement location and the emitter. The lines of bearing should intersect at the emitter location. However, due to measurement noise, the lines of bearing almost never truly intersect at a single point. Statistical methods are commonly used to estimate the emitter location, which includes an estimate of the uncertainty of the emitter location indicated by location ellipses or circles. These ellipses or circles are related to the Elliptical Error Probability (EEP) or Circular Error Probability (CEP) which defines elliptical or circular regions with the minimum area or volume that contain the true location with some specified probability. Generally, the precision of the geolocation solution is directly proportional to the angular spread of the lines of bearing (or equivalently to the length of the flight path baseline) and inversely proportional to the precision of the angular measurements. Thus, a system with precision angular measurements will provide precision geolocation estimates. The LBI antenna system and methods of the present invention provides very precise angular measurements.

While the definitions are somewhat arbitrary, various classes of long baseline interferometers are identified in FIG. 2. Obviously, these systems include some exceptionally long baseline interferometers but the algorithms and procedures to be discussed are compatible with all of the categories listed in FIG. 2. In the discussion that follows, the embodiment described includes a pair of antenna elements separated by approximately 30 meters (or nominally 100 ft). When operating over a frequency range of 0.5 GHz to 18 GHz, this equates to baselines ranging from 50 λ to 1800 λ. This places the reference system in the LBI to VLBI category. Because of unique processing associated with the long baselines, all of these systems will simply be referred to as long baseline interferometric or LBI geolocation systems. The extreme angular precision offered by these long baselines allow for very precise estimates of an emitter's location. For example, using the embodiment's 30 m antenna baseline, a single platform is able to produce geolocation accuracies on the order of 100 feet at ranges of 120 nmi.

Figure 3:
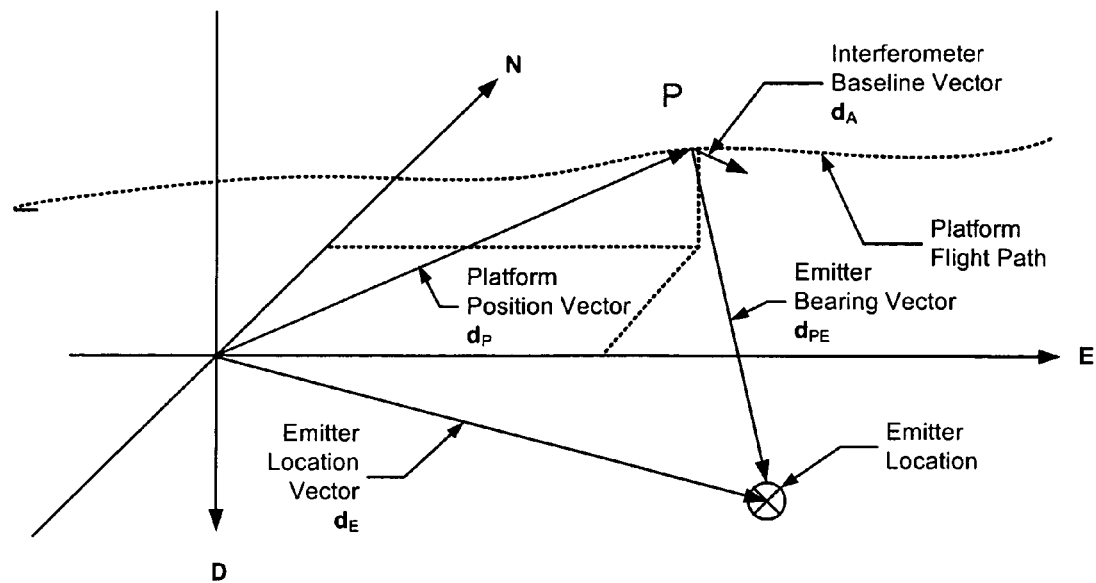
FIG. 3 is a diagram of the geometry and various vector variables associated with an observation by a single platform geolocation system traveling along a flight path.

The geometry and various vector variables associated with an observation by a single platform geolocation system traveling along a flight path are shown in FIG. 3. A northeast-down (NED) coordinate system is shown in this case, but other coordinate systems may be more appropriate at times. The platform at location P is equipped with a LBI antenna whose baseline is defined by the vector $d_a$. The platform position is defined by vector $d_p$ and its attitude defined by vector $\theta_p$ as it progresses along the indicated flight path. The platform attitude is indicated, for example, by a vector of Euler angles (although Euler angles are strictly not vectors). The emitter is assumed to be stationary and is located by vector $d_e$, although there are means to remove the stationary restriction. The platform collects interferometric differential phase measurements while traversing the flight path. By processing these differential phase measurements, along with other measurements to be discussed, the LBI system is able to generate precision estimates of the emitter location.

Figure 4:
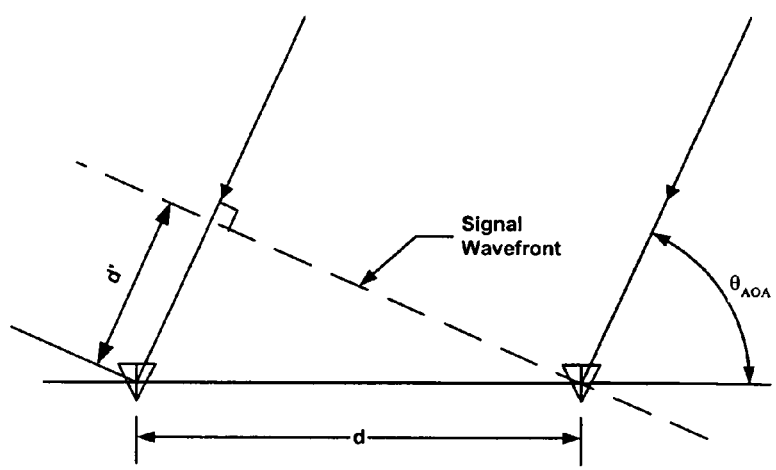
FIG. 4 is a simplified two-dimensional depiction of a signal wave front from the emitter traveling towards the two elements of the LBI antenna.

FIG. 4 is a simplified two-dimensional depiction of a signal wave front from the emitter traveling towards the two elements of the LBI antenna. The signal wave front from the emitter approaches at an angle of arrival $\theta_{AOA}$ relative to the baseline of the LBI antenna. The measurements from each of the two elements of the LBI antenna are analyzed and a phase difference between the two measurements is calculated.

Figure 5:
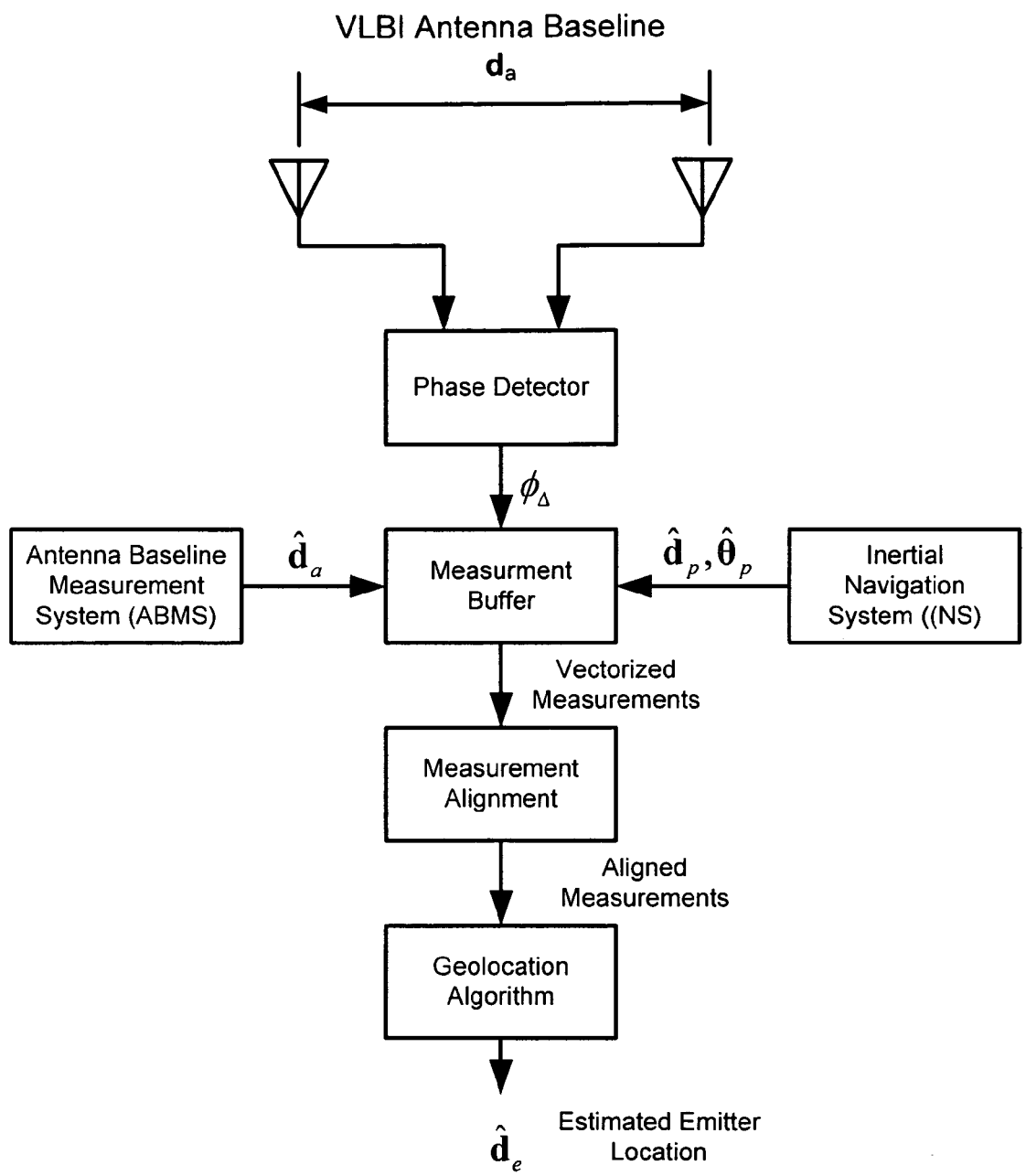
FIG. 5 is a schematic diagram of the functional elements of the LBI system.

The functional elements of the LBI system are shown in FIG. 5. The basic system comprises a two-element interferometer antenna subsystem with a physical baseline vector, $d_a$, an Inertial Navigation System (INS) capable of providing measurements of platform position, $d_p$, and attitude, $\theta_p$, and an Antenna Baseline Measurement System (ABMS) capable of providing measurements of the antenna baseline vector, $d_a$. During an observation n, the signals from both elements of the LBI antenna are received and processed by a phase detector capable of processing one or more received signals to provide interferometric differential phase measurements, $\phi_\Delta(n)$. The INS provides measurements of platform position and attitude, and the ABMS provides measurements of the antenna baseline vector. A measurement buffer stores the LBI samples and differential phase measurements, the INS measurements and the ABMS measurements. A measurement alignment is performed that interpolates the INS and ABMS data to time align their measurements with the LBI samples. The time aligned measurements are then input to a geolocation algorithm that provides precision estimates of the emitter location, $d_e$.

Properties of the LBI Antenna System

The motivation for using a long baseline interferometer is that with increasing antenna baseline length, the effective angular precision of the interferometer increases. However, since phase measurements are limited to a range of $2\pi$ radians, the number of ambiguities for the angle of arrival from the phase measurement also increases. The angle of arrival, $\theta_{AOA}$, or line of bearing in the principle (or horizontal) plane of the interferometer antenna pair is given by $$\hat{\theta}_{AOA} = \cos^{-1}\left(\frac{\lambda(\phi_\Delta - 2\pi k_\phi)}{2\pi L}\right) \quad (1)$$

where $\phi_\Delta$ is the measured differential phase, $\lambda$ is the carrier wavelength, L is the length of the interferometer baseline, and $k_\phi$ is the ambiguity integer.

Generally, the ambiguity integer $k_\phi$ will not be known and the line of bearing will be ambiguous. For long interferometric baselines, the total number of ambiguities will be on the order of $2L/\lambda$ over a ±90 degree sector. Note that K=L/λ was used to define the size of the interferometer antenna baseline in terms of wavelengths. For an LBI system, the number of ambiguities, (i.e. 2K), will be very large, on the order of 1,000 to 10,000. The ability to accommodate these ambiguities is a feature of the present geolocation algorithm.

As the length of the interferometer baseline is increased, the precision of the angular measurements increase. This precision is quantified by the standard deviation $\sigma_\theta$, which is given by $$\sigma_\theta = \frac{\lambda}{2\pi L \sin(\theta)} \sigma_\phi \quad (2)$$

where $\sigma_\phi$ is the standard deviation of the phase measurements. The latter is generally a function of the signal to noise ration (SNR) and is nominally given by $\sigma_\phi = \sqrt{2/SNR}$. Note that the standard deviation is inversely proportional to L, the length of the antenna baseline. Note also that, since $K=L/\lambda$, the standard deviation is also inversely proportional to the number of ambiguities which increase directly with K.

Practical Antenna Installations

Figure 6:
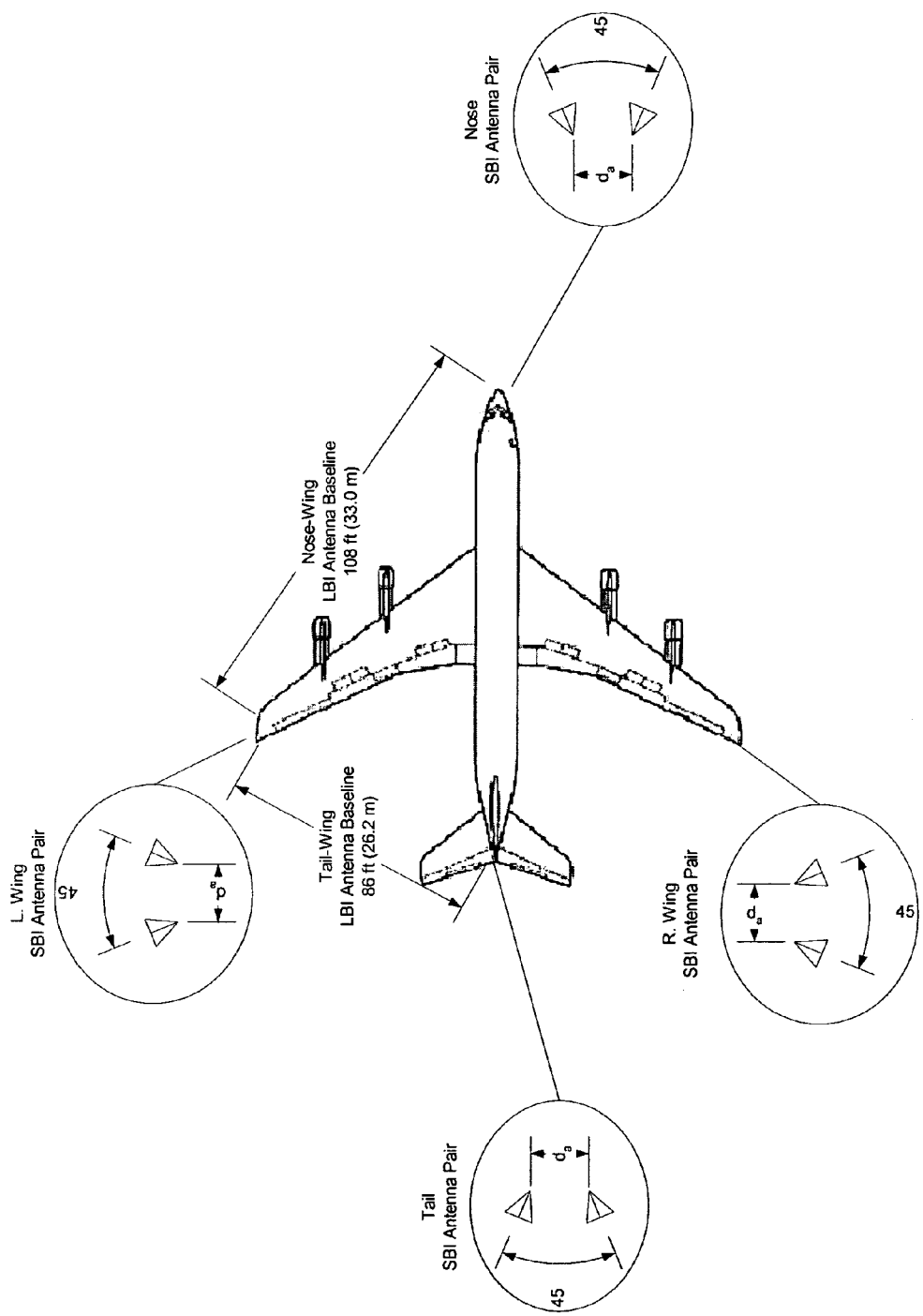
FIG. 6 shows one embodiment of the geolocation system which comprises a set of antennas installed on the nose, tail, and wingtips of a large aircraft to provide LBI antenna pairs that provide 360 degree coverage.

The basic two-element antenna configuration is generally enhanced by including additional antenna elements to increase spatial and/or frequency coverage. For example, one embodiment is as shown in FIG. 6 which comprises a set of antennas installed on the nose, tail, and wingtips of a large aircraft to provide LBI antenna pairs that provide 360 degree coverage. The antennas at each location are also configured as a pair of squinted beam short baseline interferometers. In this configuration, the adjacent pairs for each set of locations form a squinted beam long baseline interferometers.

Figure 7:
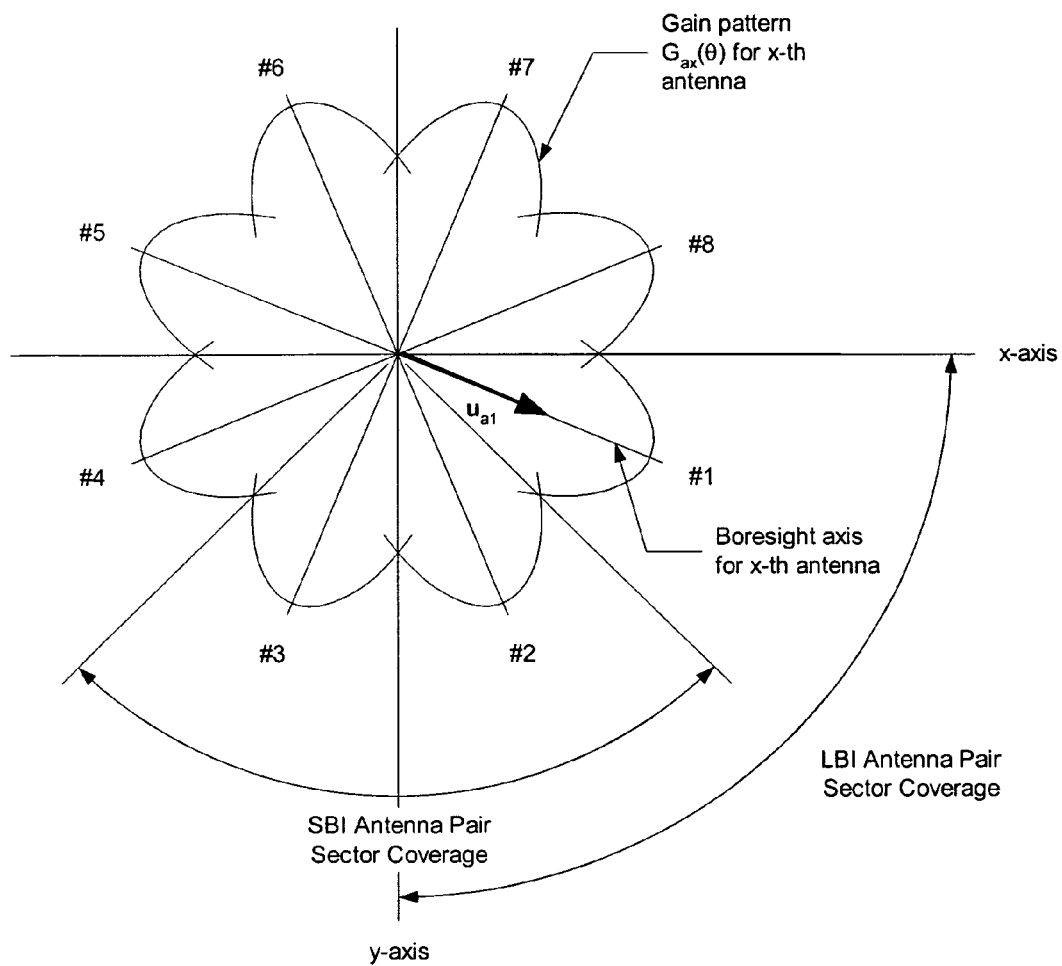
FIG. 7 shows the spatial coverage of the eight antenna elements shown in FIG. 6.

The squinted pairs and short baseline interferometers will provide coarse and medium precision angular measurements relative to that of the LBI interferometer pair but with far fewer ambiguities. These features will be used to aid in improving the convergence properties of the LBI based geolocation algorithm to be discussed. FIG. 7 shows the spatial coverage of the eight antenna elements shown in FIG. 6 resulting from the physical location and beam squint. Multiple sets of antennas can also be installed at each location to operate over multiple frequency bands as may be required.

Figure 8:
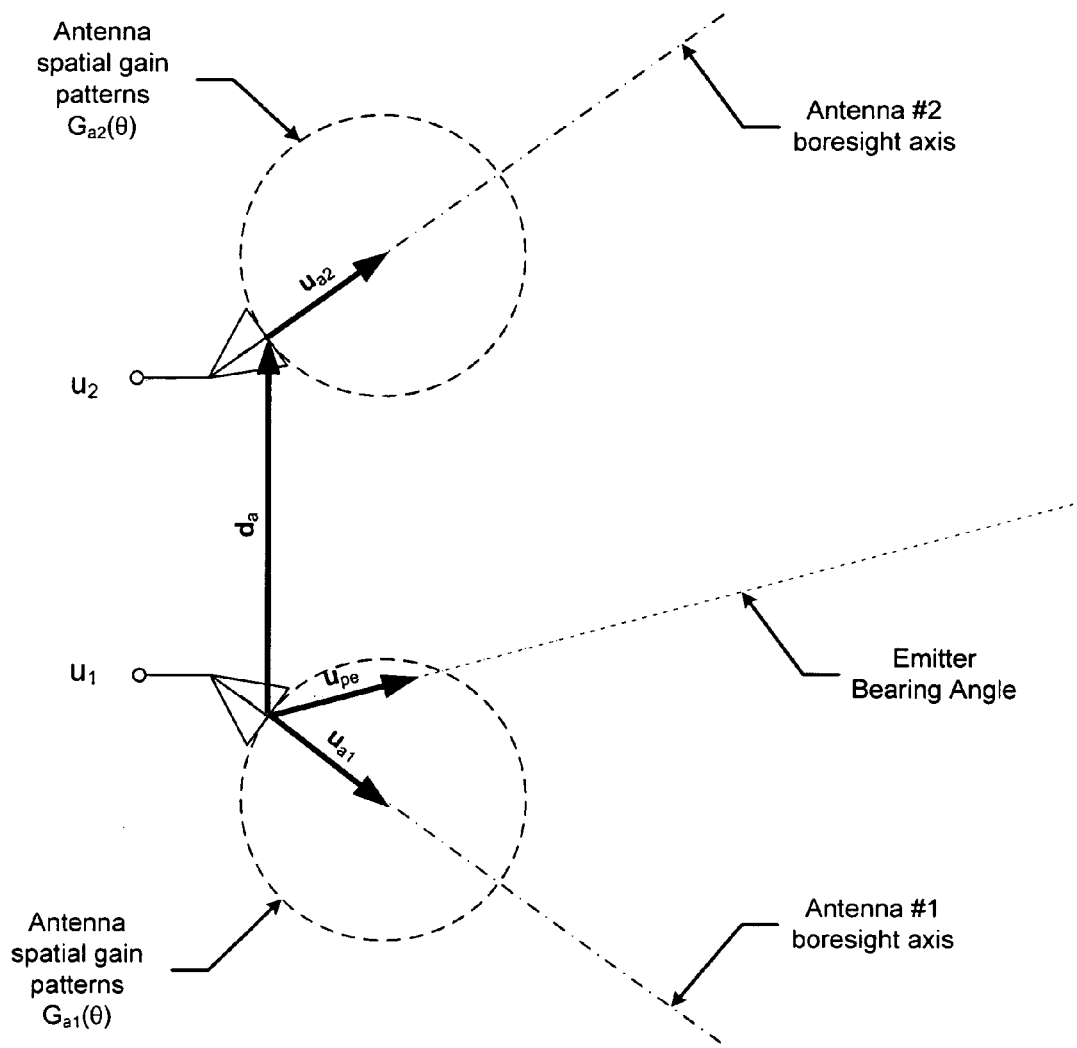
FIG. 8 shows the geometry of a squinted beam antenna pair.

The squinted beam pairs are capable of providing a number of measurements that contain bearing information that can be exploited for estimating the emitter location. These include differential amplitude, $a_\Delta$, differential time of arrival, $\tau_\Delta$, and differential phase, $\phi_\Delta$. These are generally referred to as amplitude difference of arrival (ADOA), time difference of arrival (TDOA) and phase difference of arrival (PDOA). These measurements can be defined using the symbols shown in FIG. 8. Let the carrier frequency be $f_o$, and c be the velocity of propagation. The measurement variables are given by:

$$\text{ADOA: } a_\Delta = f_a(u_{a1}, u_{a2}, d_p, d_e) = 10 * \log 10 \left( \frac{G_{a1}(\cos^{-1}(u_{a1}^t u_{pe}))}{G_{a2}(\cos^{-1}(u_{a2}^t u_{pe}))} \right) \quad (3a)$$

$$\text{TDOA: } \tau_\Delta = f_r(d_a, d_p, d_e, f_o) = \frac{1}{c} \frac{d_a^t d_{pe}}{[d_{pe}^t d_{pe}]^{1/2}} \quad (3b)$$

$$\text{PDOA: } \phi_\Delta = f_\phi(d_a, d_p, d_e, f_o) = \frac{2\pi f_o}{c} \frac{d_a^t d_{pe}}{[d_{pe}^t d_{pe}]^{1/2}} \quad (3c)$$

The Geolocation Algorithm

The geolocation algorithm will first be described in general terms and then in more specific terms when a multi-step algorithm is described.

Let z be a set of differential phase measurements on some variable y generated by the LBI system as the platform is traversing the flight path. Here, y can include any of the measurements described by (3a), (3b) and/or (3c). By set, we mean a vectorized collection of N sequential measurements.

$$z = \begin{bmatrix} y(1) \\ y(2) \\ \vdots \\ y(N) \end{bmatrix} + \begin{bmatrix} w(1) \\ w(2) \\ \vdots \\ w(N) \end{bmatrix} \quad (4)$$

Where y(n) is the n-th sequential differential phase measurements and w(n) is the noise associated with the n-th sequential measurement.

A vectorized set of synthesized measurement values $\hat{z}$ can be generated as a function of some postulated emitter location $\hat{d}_e$ along with as set of parameters $\hat{\beta}$ that includes all other relevant variables. For example, $\beta$ can include the platform location $\hat{d}_p$ and orientation $\hat{e}_p$, and the LBI antenna vector $\hat{d}_a$, and others parameters as required. The estimator is formed using the appropriate form of (3a), (3b), or (3c) corresponding to the variable y and using the known measured value of the variables in place of the unknown true values. This is generally indicated by $$\hat{z}(n) = f_y(\hat{d}_e, \hat{\beta}) \quad (5)$$

The use of the hat symbol indicates that the measured or estimated values. Note that all measurements are adjusted to be time aligned with y(n).

The geolocation algorithm is based on a process that attempts to determine an estimated emitter location that generates a set of synthesized measurement variables $\hat{z}$ that best matches the corresponding set of actual measurements z in the least squares sense. Mathematically, this is indicated by $$\min_{\hat{d}_e} \| z - \hat{z}(\hat{d}_e, \hat{\beta}) \|_B \quad (6)$$

Where $\|\cdot\|$ indicates a suitable norm and B is a suitable weighting matrix. Typically, the L2 norm is used and the weighting matrix B is the inverse of the covariance matrix associated with the measurement variable (i.e. $B = \Sigma_z^{-1}$).

Figure 9:
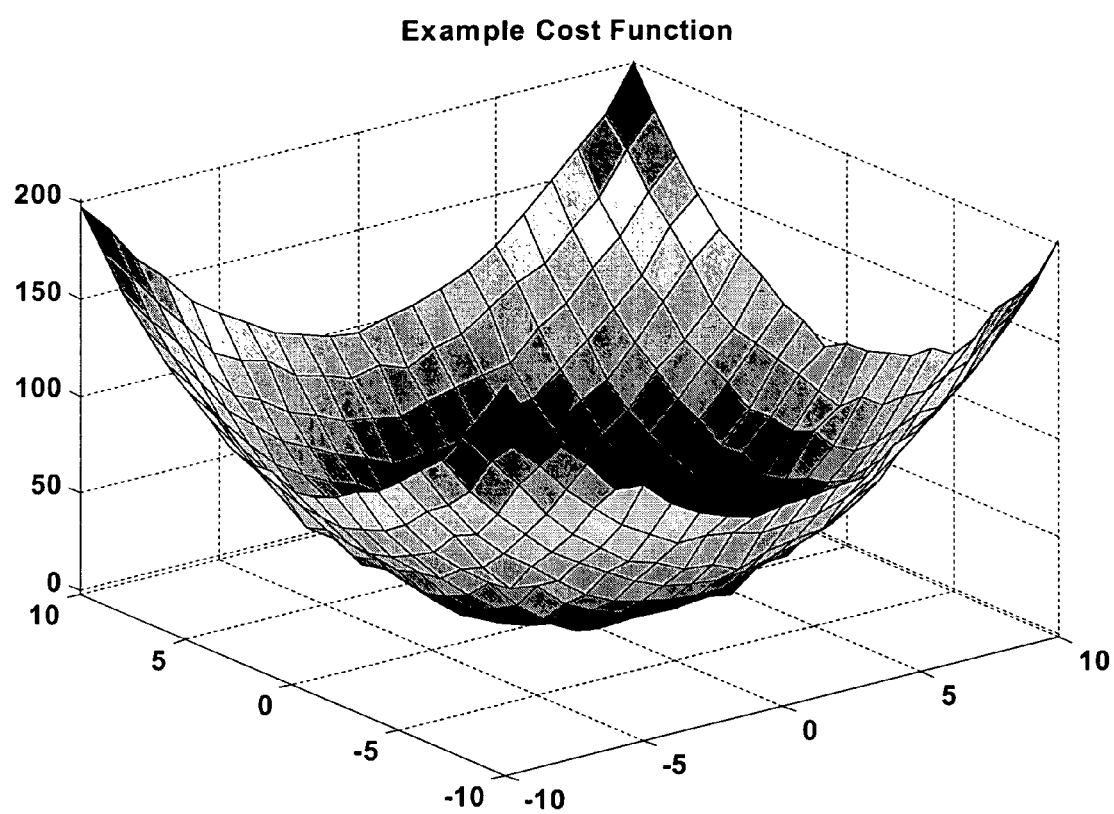
FIG. 9 shows the quadratic like surface of a cost function near the solution point.
Figure 12:
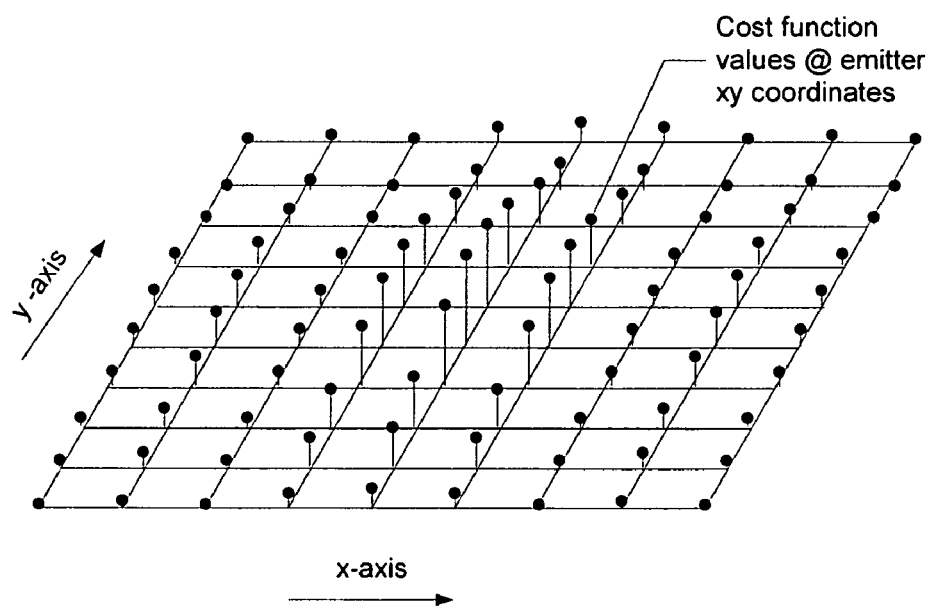
FIG. 12 illustrates a grid of the cost function values for several emitter locations on an x-y plot.
Figure 13:
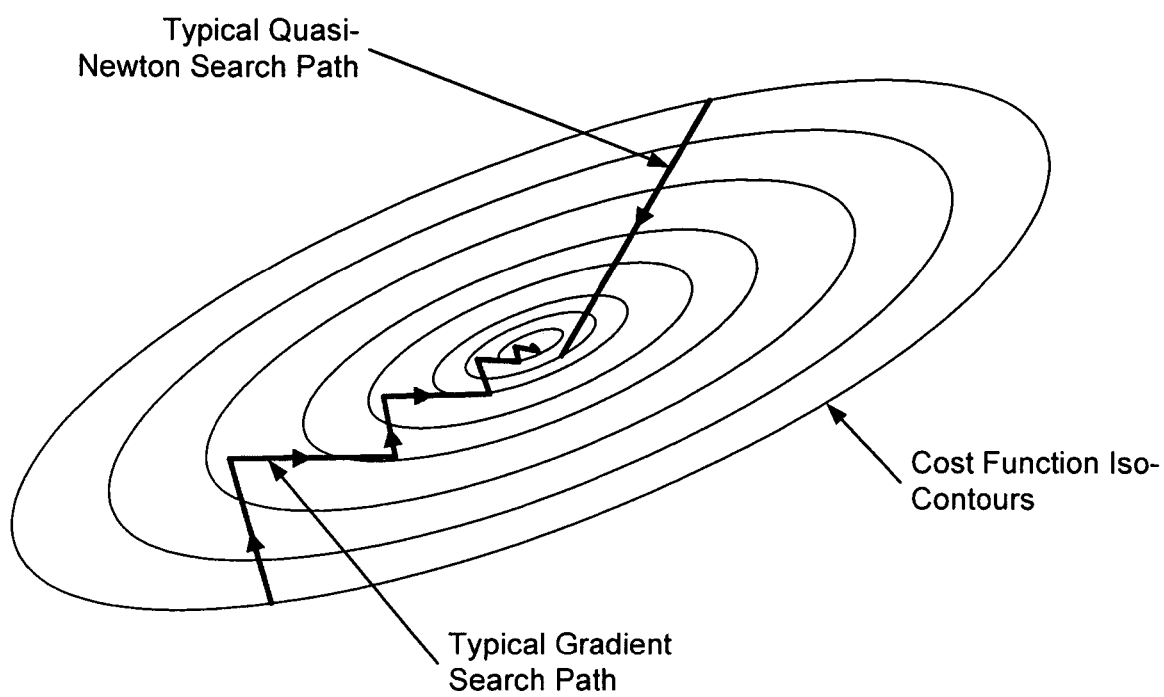
FIG. 13 illustrates a comparison a typical quasi-Newton search path and a typical gradient search path of a cost function.

FIG. 9 shows the quadratic like surface of the cost function $C = \| z - \hat{z}(\hat{d}_e, \hat{\beta}) \|_B$ near the solution point. As the collection of measurements increase in length, the quadrature curvature becomes more pronounced enhancing the accuracy of the solution. However, at points removed from the true solution, the cost surface becomes ill defined and many local minimum may exist that potentially could lead to false solutions. To overcome this situation, the least squares process is generally implemented in two stages. Stage 1 is a coarse search based on a grid structure, such as shown in FIG. 12, to locate a coarse but global minimum. The grid is configured to be large enough in extent to contain the global minimum and yet fine enough to distinguish the global minimum from adjacent points in the grid structure. Stage 2 then uses a search procedure to locate the exact minimum. A number of search routines exist suitable for this task, including ones based on a gradient method and ones based on the Newton or quasi-Newton method. The general characteristics of both of the latter methods are illustrated in FIG. 13.

Figure 10:
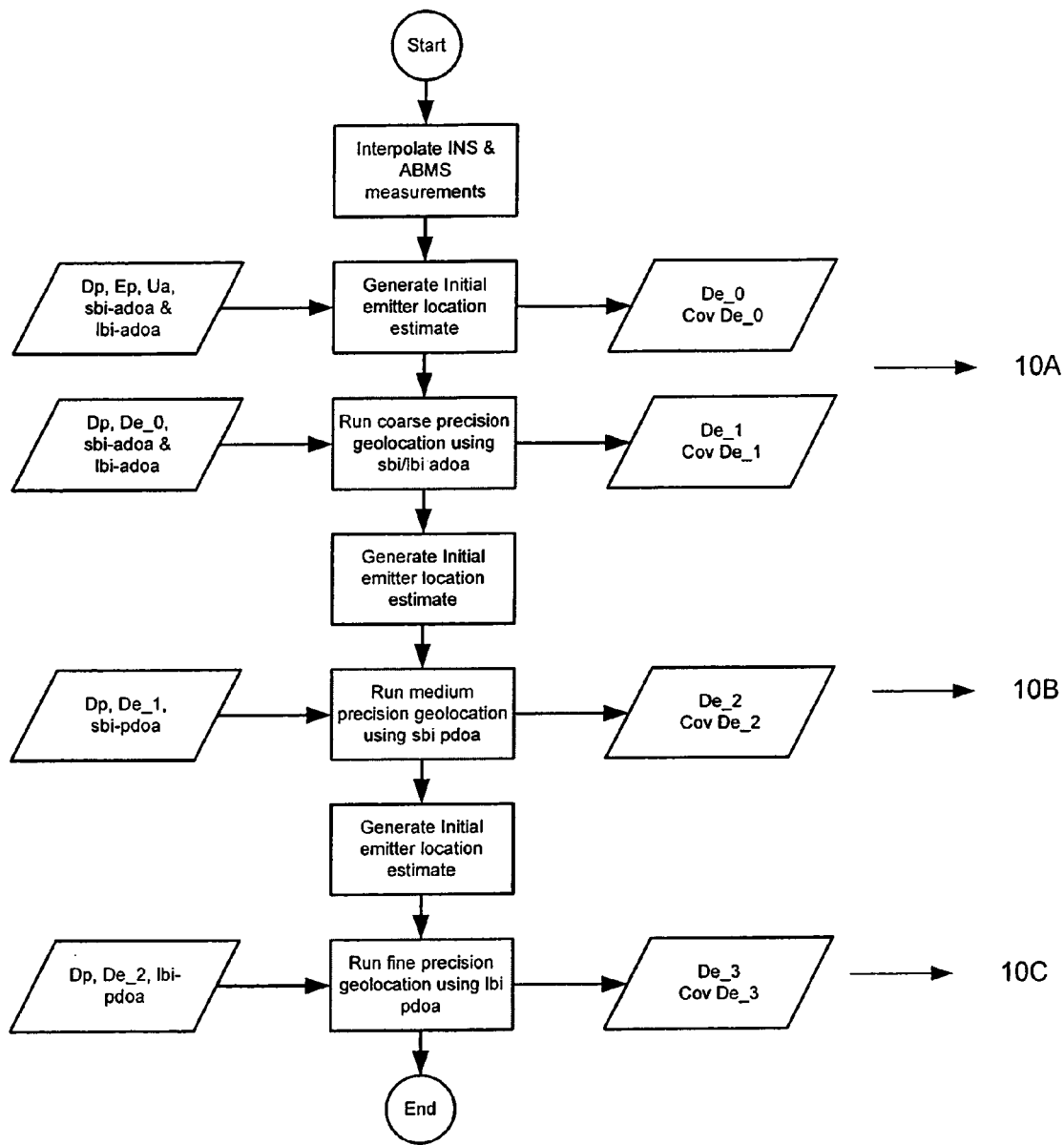
FIG. 10 shows a geolocation method for finding an emitter location.

To aid in this process, the coarse and medium precision capabilities of the squinted beam short baseline interferometers, such as those shown in the embodiment of FIG. 6, can be used to enhance the search for the global minimum. This process is illustrated in FIG. 10. The surfaces shown on the right side are the inverse of the cost functions, such as shown in FIG. 9 (i.e. $C^{-1}$) because it has better illustration characteristics. The minimum of the original cost function in FIG. 9 is now the peak of the surface shown in FIG. 10. However, the functionality of the cost functions is exactly the same.

Figure 11:
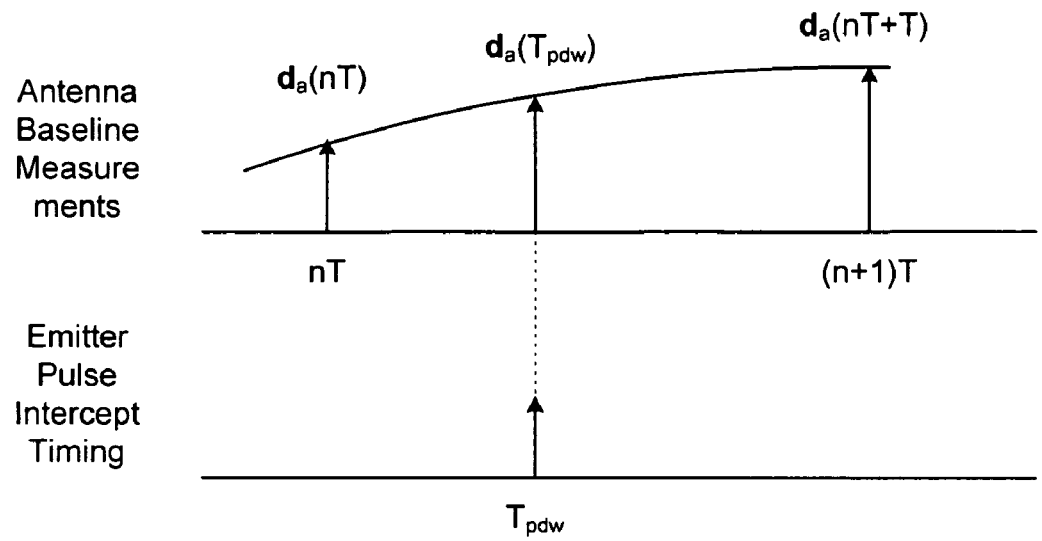
FIG. 11 illustrates the process of interpolating the INS and ABMS measurements to time align with the LBI antenna measurements.

Step 1 of the geolocation algorithm shown in FIG. 10 interpolates the INS and ABMS measurements to align these measurements with the time of the LBI antenna measurements. This process is illustrated in FIG. 11. The top portion shows the time line for the ABMS generated antenna baseline measurements. These measurements are indexed by variable n but the physical time of measurements, $t_n$, corresponds to time $t_n = nT_s$. The lower portion of the figure shows the time line for the LBI signal measurements for a specific pulse indicated by time $T_{pdw}$. Since the ABMS measurements can generally be assumed to be band limited and critically sampled, its measurements can be interpolated to generate estimates that correspond to the time of the LBI system measurements.

Steps 2 and 3 constitute a coarse geolocation estimation process that makes use of the amplitude difference (ADOA) measurements produced by the squinted beams of the SBI and/or LBI antenna elements. These measurements, $z_a \sim a_\Delta$, are an amplitude difference of arrival measurement (ADOA) given by (3a). A cost function for these differential amplitude measurements is formed based on that given in (6).

$$C_1 = \|z - \hat{z}_a(\hat{d}_e, \hat{\beta})\|_{\hat{B}} \tag{7}$$

The estimating function is obtained from (3a). That is $$\hat{z}_a(n) = f_a(\hat{u}_{a1}, \hat{u}_{a2}, \hat{d}_p, \hat{d}_e) = 10 * \log 10 \left( \frac{G_{a1}(\cos^{-1}(\hat{u}_{a1}^t \hat{u}_{pe}))}{G_{a2}(\cos^{-1}(\hat{u}_{a2}^t \hat{u}_{pe}))} \right) \tag{8}$$

Step 2 provides the coarse estimate of the emitter location by finding the minimum of the cost function using the grid structure. The inputs consist of the platform position, Dp, and attitude, Ep, along with the surveyed antenna boresight unit vectors, Ua. The output consists of the estimated emitter location, De_0 (i.e. $\hat{d}_e$), and location error covariance Cov_De_0 (i.e. $\Sigma_{d_e}$). The cost function is generally unambiguous over the sector of coverage defined as the region between the antenna boresight vectors. Consequently, this first step is generally satisfied if the emitter can be localized to the correct octant.

Figure 10A:
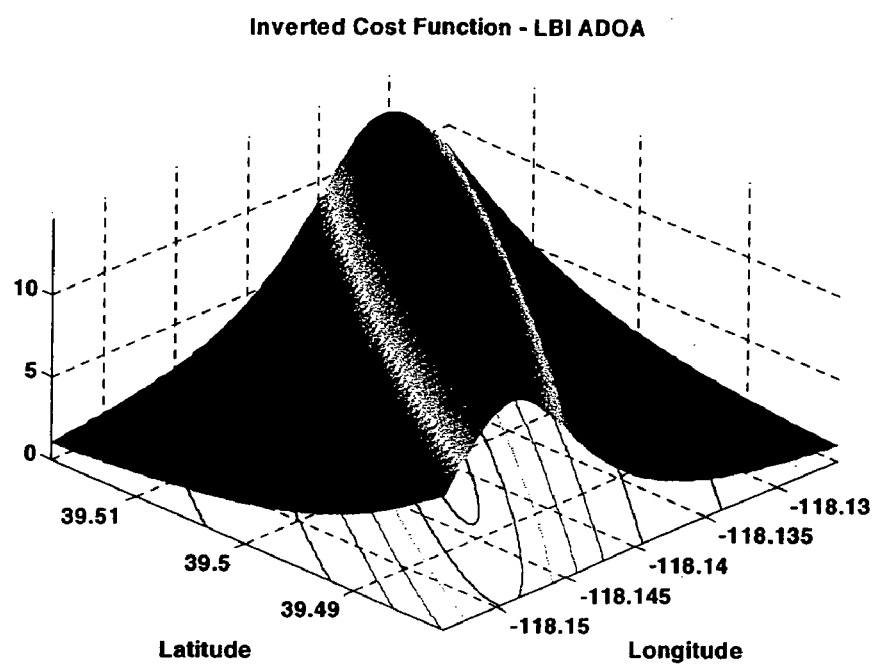
FIG. 10A shows a cost function surface generated using amplitude difference of arrival measurements used to estimate a coarse precision emitter location.

Step 3 is a fine search using the quasi-Newton method previously identified. This process will provide an emitter location corresponding to the peak of the surface shown in FIG. 10A. Its inputs are the same as used in Step 2 and the outputs are the coarse precision emitter location De_1 and its error covariance Cov_De_1.

Steps 4 and 5 constitute a medium geolocation process that makes use of the short physical separation of the SBI configuration to generate another set of differential phase interferometer (i.e. PDOA) measurements. A second cost function is formed based on the SBI differential phase measurements.

$$C_2 = \|z - \hat{z}_\phi(\hat{d}_e, \hat{\beta})\|_{\hat{B}} \tag{9}$$

The estimating function $\hat{z}_\phi(n)$ is obtained from (3c)

$$\hat{z}_\phi(n) = f_\phi(\hat{d}_a, \hat{d}_p, \hat{d}_e, \hat{f}_o) = \frac{2\pi \hat{f}_o}{c} \frac{\hat{d}_a^t \hat{d}_{pe}}{\left[\hat{d}_{pe}^t \hat{d}_{pe}\right]^{1/2}} \tag{10}$$

Step 4 generates an initial starting point for the medium emitter location process. Usually, the location produced by Step 3 is adequate for this estimate. If needed, a coarse search using the grid structure can also be used.

Figure 10B:
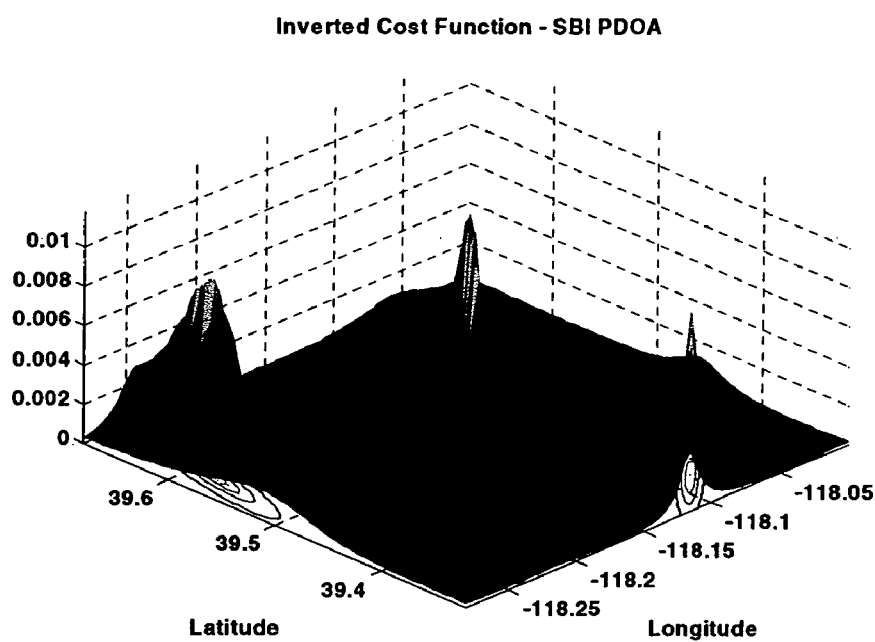
FIG. 10B shows a cost function surface generated using short baseline interferometer phase difference of arrival measurements used to estimate a medium precision emitter location.

Step 5 uses a quasi-Newton search routine to locate a precise estimate of the medium emitter location using the surface shown in FIG. 10B. It uses the SBI phase measurements, $z_\phi(n)$, and platform location, Dp, and attitude, Ep. It produces outputs of medium precision emitter location De_2 along with an estimate of its covariance Cov_De_2.

The emitter location estimates produced by these steps have higher precision than the coarse ADOA but much less than the precision LBI PDOA measurements. However, they have considerably less ambiguities that are easily resolved using the geolocation results obtained from coarse ADOA measurements used in Step 3 and is often precise enough to resolve the ambiguities contained in the final LBI PDOA geolocation results obtained in Step 6.

Steps 6 and 7 constitute the final high precision geolocation process and makes use of the differential phase measurements (i.e. PDOA) obtained from the LBI antenna pairs. A third cost function is formed based on the LBI differential phase measurements.

$$C_3 = \|z - \hat{z}_\phi(\hat{d}_e, \hat{\beta})\|_{\hat{B}} \tag{11}$$

The estimating function has the same form as (3c) but uses the differential phase measurements from the LBI antenna pair.

Step 6 generates the initial emitter location estimate for this process. Here, the emitter location produced from the SBI PDOA measurements may not be adequate to insure the convergence of the quasi-Newton search. In this case a coarse search is done using a grid structure to locate an initial point near the global minimum.

Figure 10C:
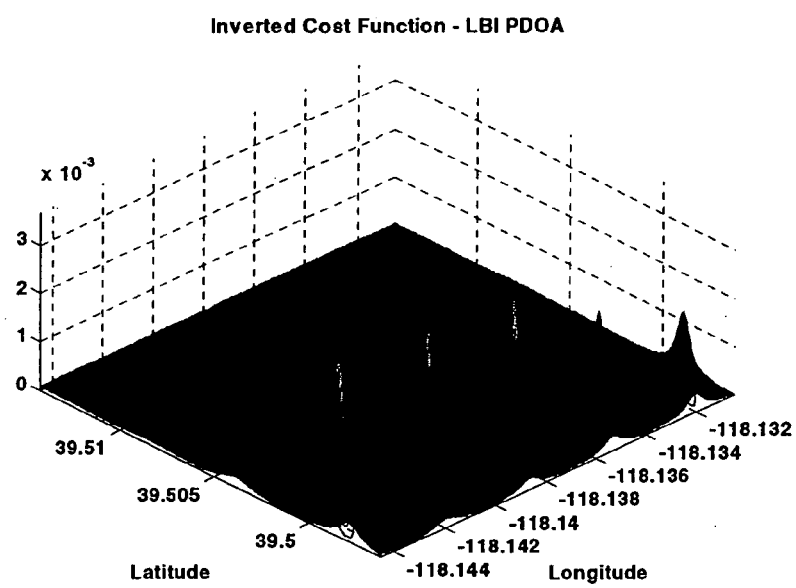
FIG. 10C shows a cost function surface generated using long baseline interferometer phase difference of arrival measurements used to estimate a high precision emitter location.

Step 7 is again a quasi-Newton search to locate the final emitter location estimate, this time using the surface shown in FIG. 10C. Inputs again consist of the platform position and attitude along with the LBI differential phase measurements. The output consists of the final high precision emitter location, De_3 along with an estimate of its error covariance Cov_De_3.

The ABMS or Antenna Baseline Measurement Subsystem

Figure 14:
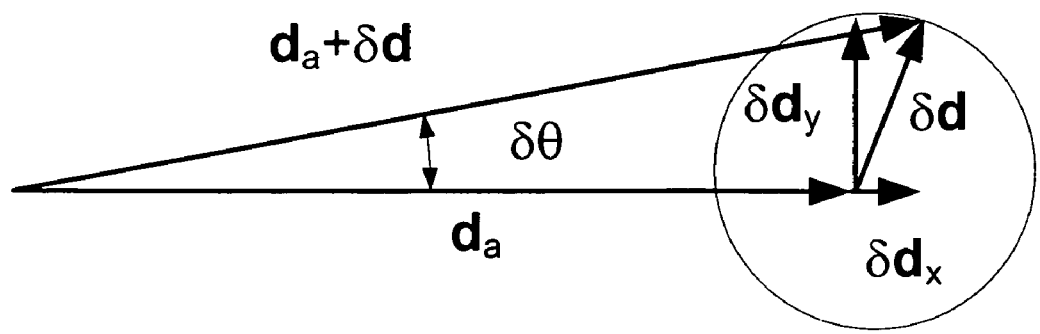
FIG. 14 shows an error component that can appear in the measurement of the true antenna baseline vector.

The least squares geolocation algorithm requires an accurate measurement of the LBI antenna baseline vector. FIG. 14 shows an error component $\delta d$ that can appear in the measurement of the true antenna baseline vector $d_a$. Proper operation of the least squares algorithm requires that the error $\delta d$ be less than $\pm \lambda/2$. For Gaussian distributed errors, this means that the standard deviation associated with the antenna baseline measurement, $\sigma_d$, should be less than $\lambda/6$. For frequencies of 18 GHz, this places an error requirement of $\pm 2.8$ mm. The allowed error is less severe at the higher wavelengths (i.e. lower frequencies).

These tolerances present certain problems when attempting to use an INS system that measures platform position and attitude and extrapolating out to the antenna baseline. First, the LBI antennas need to be surveyed very accurately to locate their positions on the platform. Second, even if the INS and surveyed positions are error free, any body flexure would preclude accurate extrapolation to the antenna baseline vector. Even by including inertial measurement units containing multi-axis accelerometers and/or gyros at the antenna locations, the inherent drift would probably preclude achieving the required accuracies.

Figure 15:
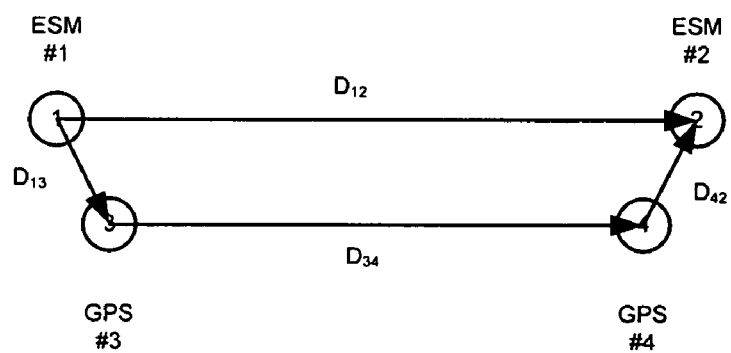
FIG. 15 shows a pair of GPS antennas located in close proximity to the LBI antennas.

The preferred method of measuring the LBI antenna baseline is based on an accurate navigation or location system, an example being the GPS system. FIG. 15 shows a pair of GPS antennas located in close proximity to the LBI antennas. The conventional GPS system will be able to locate either GPS antenna to an accuracy of a few meters. This level of accuracy is sufficient to locate the base of the LBI antenna vector but is not sufficient for the baseline vector itself. To determine the baseline vector, use is made of the so called differential carrier GPS method. This system uses the differential phase measurement of the GPS signal to estimate the baseline between two GPS antennas. Accuracies with standard deviations on the order of $\lambda/50$ have been reported which is equivalent to approximately 4 mm.

The LBI antenna baseline is obtained by extrapolating the results from the GPS antenna baseline vector. The differential carrier GPS system is able to provide an accurate estimate of the GPS antenna baseline vector $d_{34}$. The offset vectors, $d_{13}$ and $d_{42}$ are measured as part of the antenna installation. The LBI antenna baseline is obtained using vector summation (i.e. $d_a = d_{34} + d_{13} + d_{42}$). The offset vectors typically are measured in a body coordinate system at the time of the sensor location survey. These vectors can be converted to the appropriate coordinate system using the platform attitude vector $\theta_p$ supplied by the INS. The offset vectors are generally small enough that errors associated with the INS system measurements and/or body flex can be contained in the error budget to meet the $\lambda/6$ requirement.

Figure 16:
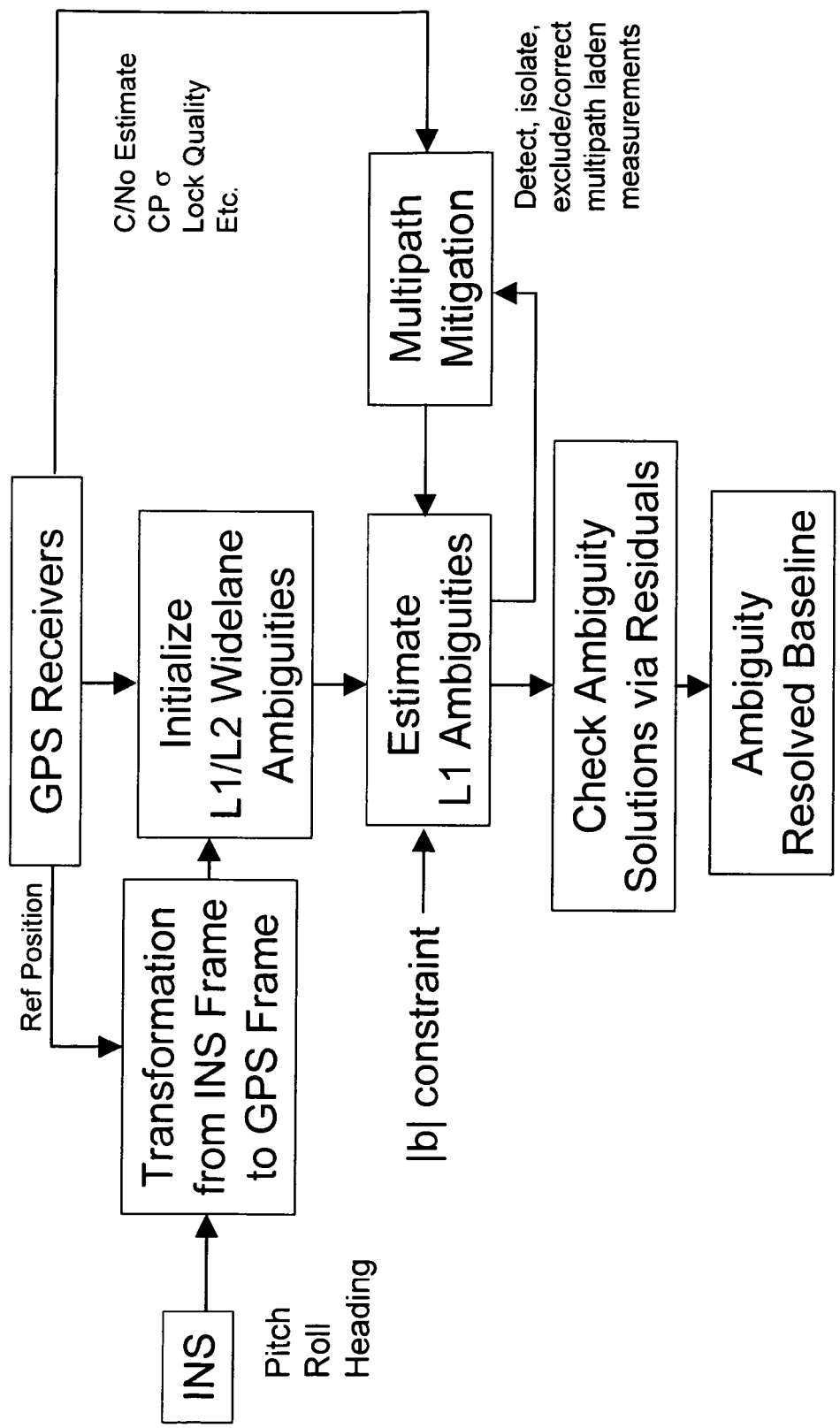
FIG. 16 shows the signal processing for the GPS based antenna baseline measurement system.

The maximum sampling rate of the GPS system used in the ABMS is limited to rates to less than 100 Hz, which limits the Nyquist bandwidth to half the sample rate or 50 Hz in this case. This may be adequate for most situations, but if higher bandwidths are needed, then a set of Inertial Measurement Units (IMUs) containing multi-axis accelerometers and/or gyros can be placed in close proximity to the LBI and GPS antennas to provide high bandwidth estimates of the local motion in the vicinity of the GPS antennas. The sampling rate can be extended to much higher frequencies by combining the low frequency portions of the GPS measurements with the high frequency components of the IMU measurements using well known techniques. The signal processing for the GPS based ABMS is shown in FIG. 16.

Figure 17:
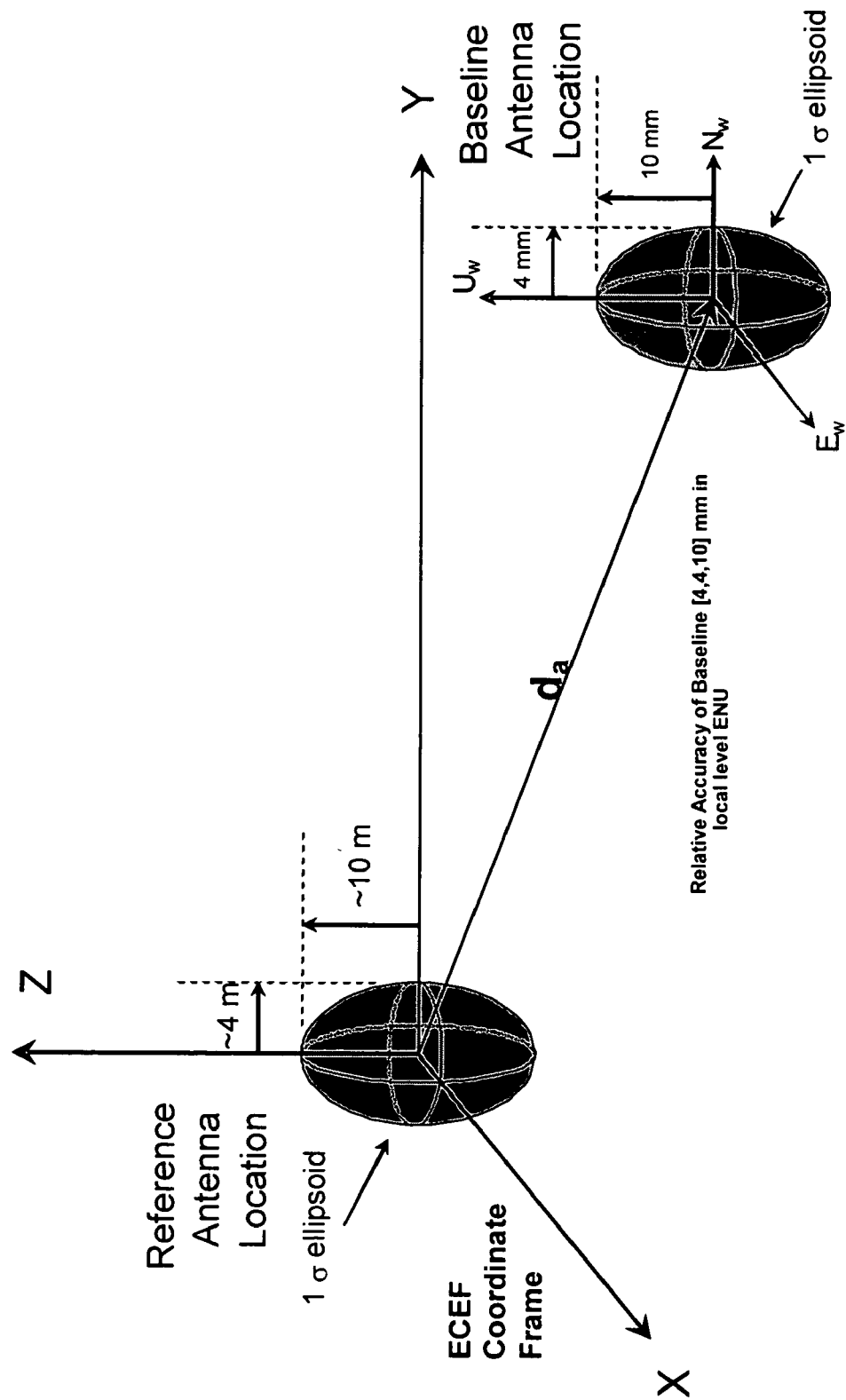
FIG. 17 shows the performance characteristics of the GPS based antenna baseline measurement system.

The performance characteristics of the GPS based ABMS is shown in FIG. 17. The conventional GPS system will provide estimates of the base of the LBI antenna with an ellipsoidal EEP whose axis are [4,4,10] m in the XYZ direction of the ECEF coordinate system. The differential carrier method will provide an estimate of the LBI vector itself with an ellipsoidal EEP whose axis are [4,4,10] mm in the XYZ direction of the ECEF coordinate system.

The Calibration Subsystem

In practical implementations of the interferometric receiver and ABMS, certain bias terms will be present in the differential phase and antenna baseline measurements. For example, phase biases exist in the LBI receivers due to uncalibrated differential delays and in the antenna baseline due to errors in surveying the offsets between the GPS antennas and the LBI antennas. These bias errors can introduce significant shifts in the estimated emitter position. For LBI interferometric phase measurement bias $\mu_\phi$ and antenna baseline bias measurement $\mu_a$, the effect can be measured in terms of an equivalent shift in bearing angle $\Delta\theta_{az}$.

$$\Delta\theta_{az} \approx \begin{cases} \dfrac{\mu_a}{L}, & \text{for antenna baseline bias} \\ \dfrac{\lambda \mu_\phi}{2\pi L}, & \text{for receiver differntial phase bias} \end{cases} \quad (12)$$

Subsequently, the shift in the estimated emitter location shift can be estimated by $$S_\phi \triangleq \frac{\Delta x}{\mu_\phi} = \frac{\lambda R}{2\pi L} \quad (\sim 2.1 \text{ m/}deg) \quad (13)$$

$$S_a \triangleq \frac{\Delta x}{\mu_a} = \frac{R}{L} \quad (\sim 7.4 \text{ m/mm})$$

The numerical values listed in (13) are obtained for L=30 m, $\lambda$=10 cm and R=120 nmi.

Figure 18:
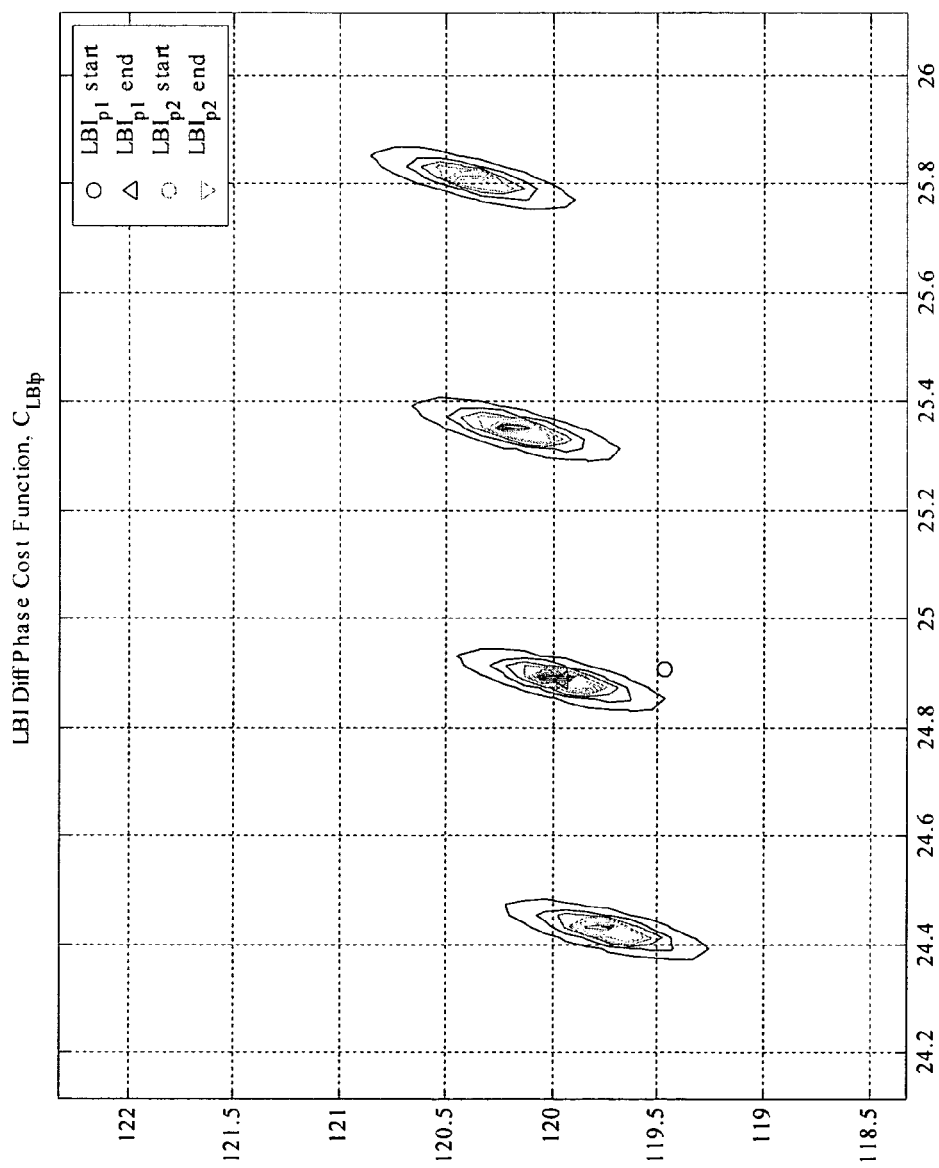
FIG. 18 illustrates the effect of receiver phase bias error.

The effect of receiver phase bias error is illustrated in FIG. 18. The grid is in nautical miles and the true emitter is located in the center at location [25,120]. A 90 degree phase bias was introduced into the differential phase measurement which, from (13), should induce a 189 m shift in the estimated emitter location relative to its true location. This shift in estimated emitter location is confirmed in FIG. 18.

Four calibration routines have been developed to counteract the presence of such bias terms. These are referred to as: 1) The First Difference Method, 2) The Extended Vector Method, 3) The Known Emitter Method, and finally 4) The Multiple Emitter Method. These techniques generally can be used individually or in combination.

In all of the methods, assume that the measurements of the differential phase $z_\phi(n)$ and antenna baseline vector $z_a(n)$ are corrupted by additive bias and noise terms. For each sample time n, the two measurements given by $$z_\phi(n) = \phi_\Delta(n) + \mu_\phi + w_\phi(n) \triangleq \tilde{\phi}_\Delta(n) + w_\phi \quad (14)$$

$$z_a(n) = d_a(n) + \mu_a + w_a(n) \triangleq \tilde{d}_a(n) + w_a$$

where $\phi_\Delta n$ and $d_a(n)$ are the true differential phase and antenna baseline vectors, $\mu_\phi$ and $\mu_a$ the phase and antenna baseline bias terms, and $w_\phi(n)$ and $w_a(n)$ are the measurement noise terms. The variables $\tilde{\phi}_\Delta(n)$ and $\tilde{d}_a(n)$ are the bias corrupted phases and antenna baseline vectors.

The First Difference Method (FDM)

The differential phase measurements discussed to this point, $z_\phi(n)$, will be referred to as the $0^{th}$ difference phase measurement. The $1^{st}$ difference measurement, $z'_\phi(n)$, is formed by subtracting consecutive $0^{th}$ difference measurement samples. That is $$z'_\phi(n) = z_\phi(n) - z_\phi(n-1) \quad (15)$$

$$= \phi_\Delta(n) - \phi_\Delta(n-1) + w(n) - w(n-1)$$

$$\triangleq \phi'_\Delta(n) + w'(n)$$

Figure 19:
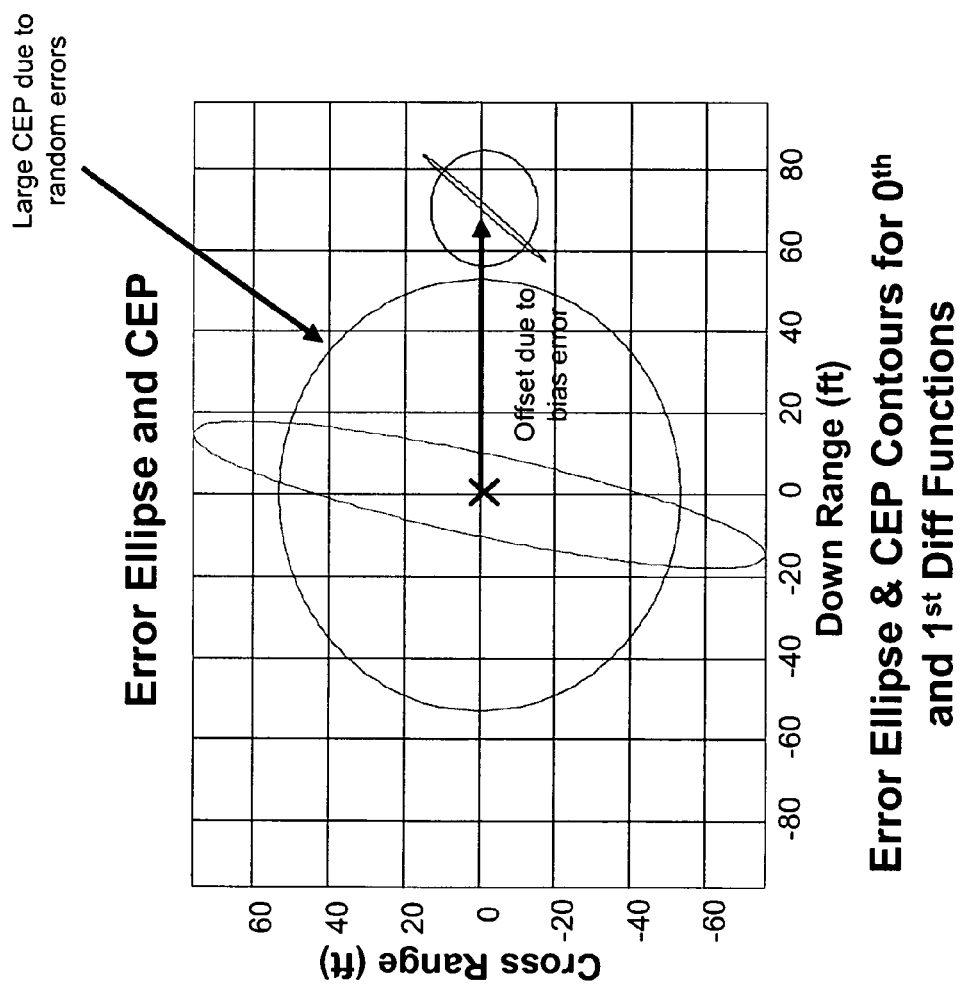
FIG. 19 illustrates the increase in sensitivity to the random error component by using the first difference which eliminates the bias term but changes the noise characteristics.

The 1$^{st}$ difference eliminates the bias term but obviously changes the noise characteristics. The latter effect accounts for the increase in sensitivity to the random error component as shown in FIG. 19.

A new cost function, $C_1$, similar in form to the 0$^{th}$ difference cost function, can be formed in terms of the 1$^{st}$ difference variables.

$$C_1 = \|z'_\phi - g'_\phi(d_e, \beta)\|_{\Sigma_{w'}^{-1}} \quad (16)$$

Here, $g'_\phi$ is the functional relationship between the first difference phase, the unknown emitter location $d_e$, and other known parameters $\beta$. The weighting vector $\Sigma_{w'}$ is the covariance of the first difference measurement noise given in (15) to provide a Maximum Likelihood estimate of emitter location $d_e$ using the Least Squares process.

The functional relationship for the first difference cost function is given by $$g'_\phi(d_e, \beta) = \begin{bmatrix} \phi_\Delta(2) - \phi_\Delta(1) \\ \phi_\Delta(3) - \phi_\Delta(2) \\ \vdots \\ \phi_\Delta(N) - \phi_\Delta(N-1) \end{bmatrix} = \begin{bmatrix} g_{\phi 2}(d_e, \beta) - g_{\phi 1}(d_e, \beta) \\ g_{\phi 3}(d_e, \beta) - g_{\phi 2}(d_e, \beta) \\ \vdots \\ g_{\phi N}(d_e, \beta) - g_{\phi(N-1)}(d_e, \beta) \end{bmatrix} \quad (17)$$

where $g_{\phi n}(d_e, \beta)$ is the n-th element of the zero-th difference measurement function $$g_{\phi n} = \phi_\Delta(n) = \frac{2\pi}{\lambda} \frac{d_a^T(n) d_{pe}(n)}{[d_{pe}^T(n) d_{pe}(n)]^{1/2}} \quad (18)$$

and $d_{pe}(n) = d_e - d_p(n)$ is the platform-to-emitter vector for the n-th sample.

From (17), it is seen that the first difference $g'_\phi(d_e, \beta)$ is related to the 0$^{th}$ difference $g_\phi(d_e, \beta)$ by the Toeplitz matrix A.

$$g'_\phi(d_e, \beta) = \begin{bmatrix} -1 & 1 & 0 & \cdots & 0 \\ 0 & -1 & 1 & & \\ \vdots & & \ddots & \ddots & \\ 0 & & & -1 & 1 \end{bmatrix} \begin{bmatrix} g_{\phi 1}(d_e, \beta) \\ g_{\phi 2}(d_e, \beta) \\ \vdots \\ g_{\phi N}(d_e, \beta) \end{bmatrix} \quad (19)$$

$$= A g_\phi(d_e, \beta)$$

The 1$^{st}$ difference phase, noise, and covariance variables are also functionally related the 0$^{th}$ difference variables by a Toeplitz matrix A.

$$\varphi'_\Delta = \begin{bmatrix} \phi'_\Delta(2) \\ \phi'_\Delta(3) \\ \vdots \\ \phi'_\Delta(N) \end{bmatrix} = \begin{bmatrix} \phi_\Delta(2) - \phi_\Delta(1) \\ \phi_\Delta(3) - \phi_\Delta(2) \\ \vdots \\ \phi_\Delta(N) - \phi_\Delta(N-1) \end{bmatrix} \quad (20)$$

$$\triangleq A \varphi_\Delta$$

$$w'_\phi = \begin{bmatrix} w_\phi(2) - w_\phi(1) \\ w_\phi(3) - w_\phi(2) \\ \vdots \\ w_\phi(N) - w_\phi(N-1) \end{bmatrix} = A w_\phi \quad (21)$$

It follows that the 1$^{st}$ difference noise covariance is given by $$\Sigma_{u'} = A \Sigma_w A^T \quad (22)$$

Substituting the latter into (16), the first difference cost function becomes $$C_1 = \|z'_\phi - g'_\phi(d_e, \beta)\|_{\Sigma_{u'}^{-1}} \quad (23)$$

$$= \|A z_\phi - A g_\phi(d_e, \beta)\|_{[A \Sigma_{u'} A^T]^{-1}}$$

$$= \|z_\phi - g_\phi(d_e, \beta)\|_{A^T [A \Sigma_{u'} A^T]^{-1} A}$$

This now has the same form as the 0$^{th}$ difference cost function except for the weighting matrix.

The Least Squares emitter location $d_e$ can be found by minimizing the cost function $C_1$ given by (16) using the 1$^{st}$ difference variables or by (23) using the 0$^{th}$ difference variables.

$$\min_{d_e} \|\tilde{z} - \tilde{g}(d_e, \beta)\|_{\Sigma_{\tilde{u}'}^{-1}} = \min_{d_e} \|z - g(d_e, \beta)\|_{A^T [A \Sigma_{u'} A^T]^{-1} A} \quad (24)$$

The numerical procedures for solving this problem can be accomplished using the Matlab Optimization Toolbox function fmincon, which is a constrained minimization procedure.

The Extended Vector Method (EVM)

The concept of the extended vector method (EVM) involves estimating the bias terms, $\mu_\phi$ and $\mu_\alpha$ by appending them to the solution vector as a means to reduce the cost function and subsequently the geolocation error.

Assume that the measurements of the differential phase $z_\phi(n)$ and antenna baseline vector $z_a(n)$ are given by (14). Let x be the extended vector $$x = \begin{bmatrix} d_e \\ \mu_\phi \\ d_a \\ \mu_a \end{bmatrix} \quad (25)$$

which includes the fixed emitter location $d_e$, the receiver phase bias scalar $\mu_\phi$, the true antenna baseline vector $d_a$, and the antenna baseline bias vector $\mu_a$. Note that the extended vector could be formulated to include only the phase bias or baseline vector bias terms but we retain both terms for the more general case, at least for the time being. The extended vector can also be expanded to include bias and random noise associated with other measurements, such as platform position, as well.

Define separate cost functions for each set of measurements.

$$C_{x\phi} = \sum_{n=1}^{N} \|z_\phi(n) - g_{x\phi}(x, \beta_x, n)\|_{\sigma_\phi(n)^{-1}} \quad (26)$$

$$C_{xa} = \sum_{n=1}^{N} \|z_a(n) - g_{xa}(x, \beta_x, n)\|_{\Sigma_a(n)^{-1}}$$

$g_{x\phi}$ and $g_{xa}$ are the estimators for $z_\phi$ and $z_a$. The estimators will be functions of the unknown parameters to be estimated, x, and other known parameters $\beta_x$ and are given by $$g_{x\phi}(x, \beta_x, n) = \frac{2\pi}{\lambda} \frac{d_a^T(n) d_{pe}(n)}{[d_{pe}^T(n) d_{pe}(n)]^{1/2}} + \mu_\phi \quad (27)$$

$$g_{xa}(x, \beta_x, n) = d_a(n) + \mu_a$$

As with the previous case, the platform position vector $d_p$ is assumed to be known. This assumes the INS measurements are error free. However, if the INS errors become significant, then the bias and noise associated with the INS, can be treated in the same way as the errors associated with the ABMS. Note that $g_{x\phi}$ is similar to the $g_\phi$ used in the $0^{st}$ difference development but now explicitly includes the bias terms $\mu_\phi$ and $\mu_a$.

The cost function to be used for the least squares process is a weighed sum of the two cost functions.

$$C_x = c_1 C_{x\phi} + c_2 C_{xa} \quad (28)$$

The weights $c_1$ and $c_2$ can be selected to balance the effect of the two cost factors $C_{x\phi}$ and $C_{xa}$ on the estimated emitter location using procedures similar to that done to establish sensitivity. For example, the reciprocal of the sensitivity values $S_\phi$ and $S_a$ could be used.

The Least Squares solution for the extended vector case is stated as follows $$\min_x C_x = \min_x [c_1 C_{x\phi} + c_2 C_{xa}] \quad (29)$$

Once the extended vector x is determined, the emitter location $d_e$ can be extracted along with the other parameters as desired. The numerical procedure involves the use of the function fmincon from the Matlab Optimization Toolbox in much the same way as for the other geolocation procedures.

The Known Emitter Method (KEM)

If the differential phase measurements are obtained from an emitter whose location is known, then the solution vector can be formulated to contain only the unknown phase and/or the antenna baseline bias vector terms. This provides a means to calibrate the system in order to allow the use of the higher accuracy $0^{th}$ difference algorithm for emitters whose unknown location is to be estimated. It should be noted that there will be procedural issues to be considered; one is the perishablity of the calibration data once it is obtained, and a second is availability of emitters with frequencies that span the range of interest. However, this procedure does allow in-flight calibration that may prove useful at least during the development stages.

Let $x_b$ be the solution vector that includes only the bias terms.

$$x_b = \begin{bmatrix} \mu_\phi \\ \mu_a \end{bmatrix} \quad (30)$$

There will be two measurements that have the same form as that used for the extended vector.

$$z_\phi(n) = \phi_\Delta(n) + \mu_\phi + w_\phi(n) \stackrel{\Delta}{=} \tilde{\phi}_\Delta(n) + w_\phi \quad (31)$$

$$z_a(n) = d_a(n) + \mu_a + w_a(n) \stackrel{\Delta}{=} \tilde{d}_a(n) + w_a$$

There will be two cost functions similar to cost functions used for the extended vector (26) except these will be defined in terms the bias solution vector $x_b$.

$$C_\phi = \sum_{n=1}^{N} \|z_\phi(n) - g_\phi(x_b, \beta_b, n)\|_{\sigma_\phi(n)^{-1}} \quad (32)$$

$$C_a = \sum_{n=1}^{N} \|z_a(n) - g_a(x_b, \beta_b, n)\|_{\Sigma_a(n)^{-1}}$$

where $g_\phi(n)$ and $g_a(n)$ are the predictors for the two measurements $z_\phi(n)$ and $z_a(n)$.

$$g_\phi(x_b, \beta_b, n) = \hat{z}_\phi(n) = \frac{2\pi}{\lambda} \frac{d^T(n) d_{pe}}{[d_{pe}^T d_{pe}]^{1/2}} + \mu_\phi \quad (33)$$

$$g_a(x_b, \beta_b, n) = \hat{d}_a(n) = d_a(n) + \mu_a$$

Note that in fact the predictors for the known emitter case are identical to those used for the extended vector (27).

A composite cost function is formed from the individual cost functions again similar to that used for the extended vector.

$$C_b = c_1 C_\phi + c_2 C_a \quad (34)$$

The departure from the extended vector occurs when forming the least squares solution since the solution vector includes only the unknown bias terms. The solution is stated as follows:

$$\min_{\lambda_b} C_b = \min_{x_b}(c_1 C_\phi + c_2 C_a) \qquad (35)$$

$$= \min_{x_b}\left(c_1 \sum_{n=1}^{N} \|z_\phi(n) - g_\phi(x_b, \beta_b, n)\|_{\sigma_\phi(n)^{-1}} + c_2 \sum_{n=1}^{N} \|z_a(n) - g_a(x_b, \beta_b, n)\|_{\Sigma_a(n)^{-1}}\right)$$

The Multiple Emitter Method (MEM)

The availability of multiple emitters can potentially enhance the performance of the extended vector approach described above for unknown emitter locations in the presence of bias errors. The availability of multiple known emitter locations can also enhance the performance of the calibration procedure discussed above for a known emitter location. The following will specifically address the extended vector approach for unknown emitter locations and the application to the known emitter case follows the same procedure developed in the section for a known emitter location.

Let there be M emitters with unknown locations. The ESM receiver will provide M sets of measurements, one for each emitter. Each measurement set will have the form $$z_{\phi k}(n) = \phi_{\Delta k}(n) + \mu_{\phi k} + w_{\phi k}(n),\ k=1, 2, \ldots, M,\ n=1,2,\ldots, N_{\phi k} \qquad (36)$$

In addition, there will be a set of antenna baseline vector measurements for each of the phase measurements $$z_{ak}(n) = d_{ak}(n) + \mu_a + w_{ak}(n),\ k=1,2, \ldots, M,\ n=1, 2, \ldots, N_{ka} \qquad (37)$$

In general, the number of phase samples will be equal to the number of antenna baseline samples for each emitter (i.e. $N_{ak} = N_{\phi k}$) and total number of antenna baseline samples will be equal to the total number of emitter phase measurement samples (i.e.

$$N_a = \sum_k N_{ak} = N_\phi = \sum_k N_{\phi k}).$$

In general, the phase sampling will be driven by the emitter pulse rate while the antenna baseline sampling will be driven by its own internal sampling clock. However, the antenna baseline samples would be interpolated to provide a set of antenna baseline samples that correspond to each of the differential phase samples Let $x_m$ be the expanded extended solution vector for the multiple emitter case.

$$x_m = [d_{e_1}^T, \ldots, d_{e_M}^T, \mu_{\phi 1}, \ldots, \mu_{\phi M}, d_a^T(1), \ldots, d_a^T(N_a), \mu_a^T]^T \qquad (38)$$

Define M+1 cost functions $$C_{\phi k} = \sum_{n=1}^{N_{\phi k}} \|z_{\phi k}(n) - g_\phi(x_b, \beta, n)\|_{\sigma_{\phi 1}^2}, \qquad (39)$$

$$k = 1, 2, \ldots, M$$

$$C_a = \sum_{n=1}^{N_a} \|z_a(n) - g_a(x_b, \beta, n)\|_{\Sigma_a^{-1}}$$

where the k in the subscript indicates the quantities associated with the k-th emitter.

The estimator functions $g_{\phi k}$ and $g_{ak}$ for each emitter have the same form as used for the extended vector with some modification to account for the multiple emitters.

$$g_{\phi k}(x_b, \beta, n) = \frac{2\pi}{\lambda_k} \frac{d_{ak}^T(n) d_{pek}(n)}{[d_{pek}^T(n) d_{pek}(n)]^{1/2}} + \mu_{\phi k} \qquad (40)$$

$$g_{ak} = (x_b, \beta, n) = d_{ak}(n) + \mu_a$$

A composite cost function is formed as a weighted sum of the individual cost functions as before.

$$C_m = \sum_{k=1}^{M} c_k C_{\phi k} + c_{M+1} C_a \qquad (41)$$

A least squares solution for all of the components contained in $x_b$ is given by $$\min_{x_m} C_m(x_b) \qquad (42)$$

The solution is obtained using the numerical techniques similar to those used in the previously discussed techniques.

Other Configurations & Options

There are other configurations and options that are directly related to the preceding discussions.

A. The preceding discussion assumes a single platform collecting sequential measurements as it traversed its flight path. The geolocation techniques disclosed apply equally to the processing of data collected by multiple platforms.

B. The preceding discussion assumed all measurement data was available for the geolocation algorithm. Recursive forms of the geolocation algorithm are also available that compute an initial estimate of the emitter location from the first few measurements and then update the estimate as more measurements are collected.

C. The preceding discussion referred to the use of differential interferometric phase measurements. Such measurements generally require overlapping pulses and some form of phase detector. When extremely long baselines are employed, the received pulses may not overlap and some other measurement procedure will be required. In these cases, the use of a cross-correlation technique may be used.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention and the attached claims are desired to be protected.

We claim:

1. A geo-location method for determining the location of an emitter using a long baseline interferometer antenna system including a first antenna element and a second antenna element mounted on a platform, the first and second antenna elements forming a long baseline antenna pair, the method comprising:
   moving the platform along a measurement path;
   collecting a series of sets of signal observations from the first and second antenna elements while the platform is moving along the measurement path, each set of signal observations being collected at a particular observation time;
   processing the signal observations to provide differential phase measurements between the signal observations of the first and second antenna elements;
   collecting platform position and attitude measurements using an inertial navigation system;
   interpolating the platform position and attitude measurements to the observation times;
   collecting measurements of an antenna baseline vector for the long baseline antenna pair using an antenna baseline measurement system;
   interpolating the measurements of the antenna baseline vector to the observation times;
   performing a coarse precision emitter location estimate using amplitude difference of arrival measurements; and
   performing a fine precision emitter location estimate using phase difference of arrival measurements.

2. The geo-location method of claim 1, further comprising:
   collecting a series of signal observations from a third antenna element at the observation times while the platform is moving along the measurement path, the third antenna element being located near the first antenna element, the first and third antenna elements forming a short baseline antenna pair; and
   processing the signal observations to provide differential phase measurements between the signal observations of the first and third antenna elements.

3. The geo-location method of claim 2, wherein the step of performing coarse precision emitter location estimate comprises:
   generating an initial emitter location estimate; and
   generating a coarse emitter location estimate using the initial emitter location estimate.

4. The geo-location method of claim 3, wherein the step of generating an initial emitter location estimate comprises:
   measuring the amplitude difference of arrival for the short baseline antenna pair;
   measuring the amplitude difference of arrival for the long baseline antenna pair;
   estimating the amplitude difference of arrival for the short baseline antenna pair, and for the long baseline antenna pair for several proposed emitter locations; and
   calculating the initial emitter location estimate to minimize the difference between the measured amplitude difference of arrivals and the estimated amplitude difference of arrivals at the several proposed emitter locations.

5. The geo-location method of claim 4, wherein the step of generating a coarse emitter location estimate comprises:
   starting at the initial emitter location estimate; and
   methodically progressing through a plurality of emitter location estimates to find the coarse emitter location estimate, the coarse emitter location estimate being the location estimate of the plurality of emitter location estimates that minimizes the difference between the measured values of the amplitude difference of arrival and the estimated values of the amplitude difference of arrival for the location estimate.

6. The geo-location method of claim 2, further comprising:
   performing medium precision emitter location estimate using phase difference of arrival measurements.

7. The geo-location method of claim 6, wherein the step of performing medium precision emitter location estimate comprises:
   measuring the phase difference of arrival for the short baseline antenna pair; and
   starting at the coarse emitter location estimate; and
   methodically progressing through a plurality of emitter location estimates to find the medium emitter location estimate, the medium emitter location estimate being the location estimate of the plurality of emitter location estimates that minimizes the difference between the measured values of the phase difference of arrival for the short baseline antenna pair and the estimated values of the phase difference of arrival for the short baseline antenna pair at the location estimate.

8. The geo-location method of claim 6, wherein the step of performing fine precision emitter location estimate comprises:
   measuring the phase difference of arrival for the long baseline antenna pair;
   starting at the medium precision emitter location estimate; and
   methodically progressing through a plurality of emitter location estimates to find the fine emitter location estimate, the fine emitter location estimate being the location estimate of the plurality of emitter location estimates that minimizes the difference between the measured values of the phase difference of arrival for the long baseline antenna pair and the estimated values of the phase difference of arrival for the long baseline antenna pair at the location estimate.

9. The geo-location method of claim 2, further comprising:
   calibrating the geo-location method to reduce the effect of measurement bias errors.

10. The geo-location method of claim 9, wherein the step of calibrating, comprises:
    computing the difference between consecutive phase measurements to compute first difference measurements; and
    computing the emitter location using the first difference measurements.

11. The geo-location method of claim 9, wherein the step of calibrating, comprises:
    solving for the receiver phase bias scalar;
    computing the emitter location using the solved value of the receiver phase bias scalar.

12. The geo-location method of claim 9, wherein the step of calibrating, comprises:
    solving for the true antenna baseline vector and the antenna baseline bias vector;
    computing the emitter location using the solved value of the true antenna baseline vector and the antenna baseline bias vector.

13. The geo-location method of claim 9, wherein the step of calibrating, comprises:

calculating the location of a known emitter using the geo-location method, the known emitter having a known emitter location;

determining the phase bias and the antenna baseline bias from the difference between the calculated location of the known emitter and the known emitter location.

* * * * *